United States Patent [19]

Krupp

[11] 4,385,683
[45] May 31, 1983

[54] SLEEVE FOR ATTACHMENT OF A CERAMIC DISK TO CYLINDRICAL SHAFT

[75] Inventor: Carroll P. Krupp, Akron, Ohio

[73] Assignee: The B. F. Goodrich Company, New York, N.Y.

[21] Appl. No.: 274,845

[22] Filed: Jun. 18, 1981

Related U.S. Application Data

[63] Continuation of Ser. No. 85,846, Oct. 18, 1979, abandoned.

[51] Int. Cl.³ .............................................. B65G 39/04
[52] U.S. Cl. .................................... 193/37; 29/116 R
[58] Field of Search ................. 193/35 R, 37; 308/20, 308/15, 18, 72, 237 R, 238; 29/110, 116 R, 132; 198/842, 843

[56] References Cited

U.S. PATENT DOCUMENTS 3,363,870  1/1968  Olson ................................. 308/238
3,847,260  11/1974  Fowler ................................. 193/37

FOREIGN PATENT DOCUMENTS 2237949  3/1973  Fed. Rep. of Germany ........ 308/20

Primary Examiner—John J. Love
Assistant Examiner—Gene A. Church
Attorney, Agent, or Firm—Michael J. Colitz, Jr.

[57] ABSTRACT

A sleeve for frictionally coupling a ceramic disk to a cylindrical shaft. The sleeve is constructed of a rigid plastic, preferably ABS with a void content to permit compression when mounting between the shaft and disk. The void content is between 25% and 50%, preferably between 40% and 50%.

1 Claim, 3 Drawing Figures

SLEEVE FOR ATTACHMENT OF A CERAMIC DISK TO CYLINDRICAL SHAFT

This is a continuation of application Ser. No. 085,846, filed Oct. 18, 1979 now abandoned.

BACKGROUND OF THE INVENTION

In the art of conveying bulk material with conveyor belts, the belt is normally moved in a closed loop conveying path from the material pick-up station to a material discharge station. While moving along the conveying path, the underside of the central portion of the belt receives support from spaced idler rolls on the underside of the belt.

After the belt moves beyond the discharge station, the upper material supporting surface of the belt is moved in a lower or belt return path whereat it is also provided with support by idler rolls. These idler rolls on the return path contact the exterior surface of the belt which had previously been carrying the bulk material. Consequently, such return idler rolls have their exterior surfaces contacted by the materials remaining on the exterior surface of the belt whereby they may become abraded, soiled or receive other damaging effects. A recent advancement in improving the performance of this type of conveyor belt system is in the utilization of ceramic disks as the return idler. Such ceramic disks are superior to other disks in that they resist abrasion and soiling which would otherwise occur if another more conventional material were to be used in this area and for this function.

The use of ceramic disks as return idler rolls, however, creates other problems. Specifically, ceramic disks or disks of glass or other porcelain type ceramic materials or the like are brittle and not ductile and cannot be readily machined or formed to the dimensional tolerances of steel or other materials previously utilized. Ceramic disks must be extruded or cast and then fired or otherwise baked to create their hard, brittle, abrasion resistance and cleanable properties, properties desirable for the subject purpose.

Such ceramic disks, due to their method of fabrication, inherently have variations in their inside diameter. This causes a problem in coupling them to the metallic cylindrical shaft upon which they must be secured for functioning.

One such approach for coupling the ceramic disks to the shaft is disclosed in U.S. Pat. No. 3,847,260. In that case, as is well known commercially, tubular sleeves are employed for coupling ceramic disks to metallic shafts. Such sleeves include ribs or projections on one or more surfaces of the intermediate sleeves. These ribs deflect and resile when slidingly coupling the shaft to the disk. Deformation of the ribs of the sleeve during mounting permits the proper coupling of the disks to the shaft during functioning.

SUMMARY OF THE INVENTION

The present invention, therefore, is directed to securing ceramic disks to shafts. This is achieved through intermediate sleeves which are cheaper, more reliable, easier to install, easier to fabricate, and generally better in all aspects to known devices for the similar purposes.

These advantages are achieved through a particular intermediate sleeve which is made of a hard plastic with a chemical blowing agent which creates a predetermined void content. The exterior surface of the sleeve may be compressed and inserted into the disk for sliding the ceramic disk thereover. The interior surface of the sleeve may then be compressed by pressing it onto the shaft. This will thus create an extremely reliable assembly which is resistant to turning or sliding due to torque pressures received from loads during normal use as an idler roll assembly.

In order to gain a better understanding of the invention as well as other advantages and further features thereof, reference is made to the following detailed description of the invention to be read in conjunction with the accompanying drawings which form part of this application.

DETAILED DESCRIPTION OF THE DRAWINGS

DESCRIPTION OF THE PREFERRED EMBODIMENTS

Figure 1:
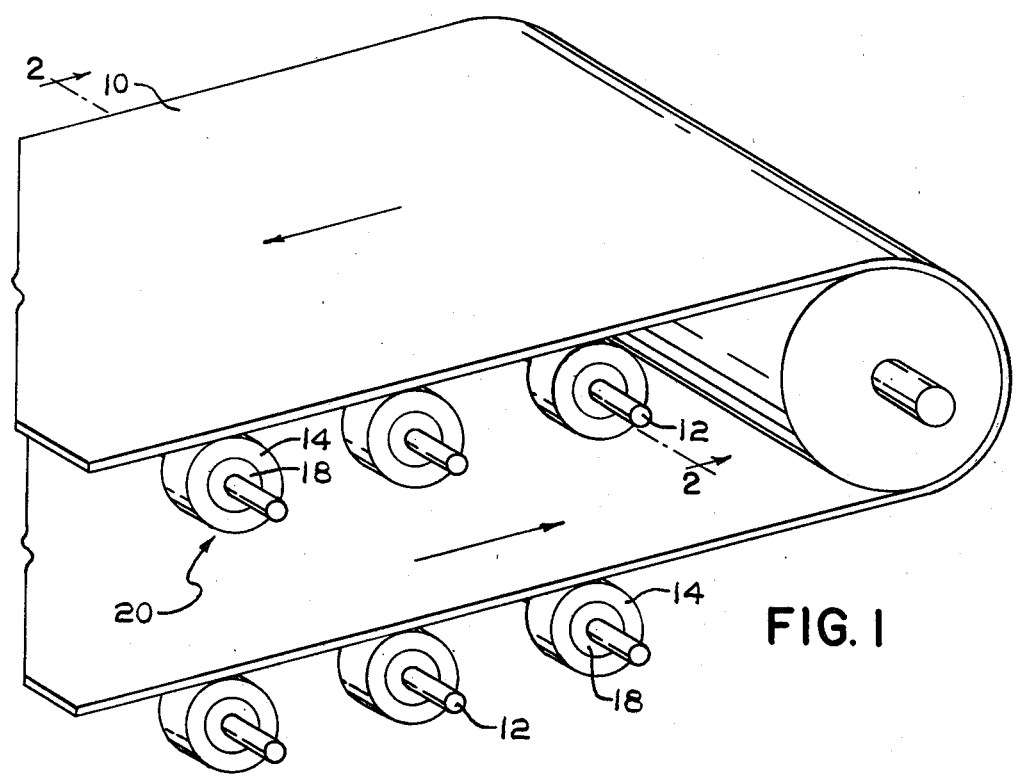
FIG. 1 is a perspective view of the invention employing the plastic sleeve for securing the ceramic disks to the cylindrical shaft.
Figure 2:
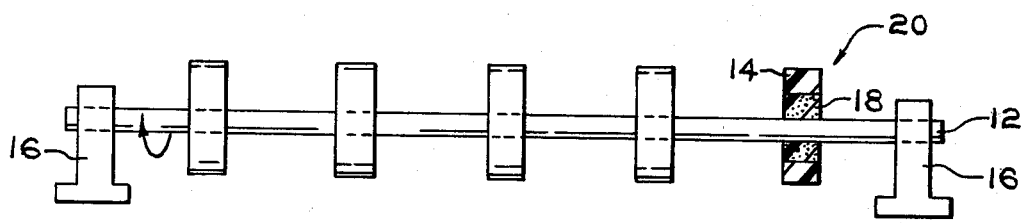
FIG. 2 is a sectional view taken along line 2—2 of FIG. 1.
Figure 3:
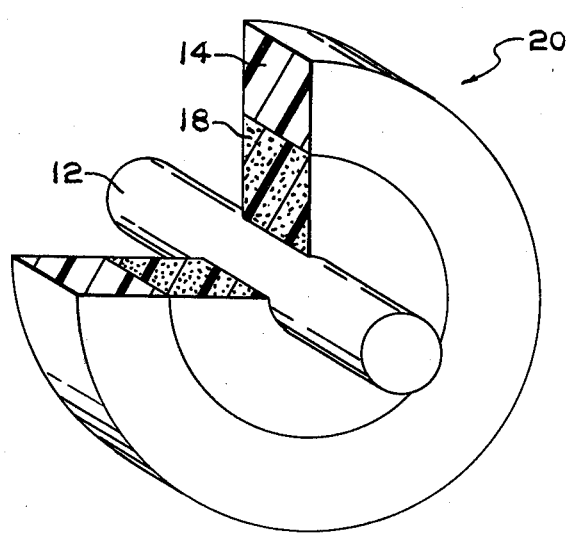
FIG. 3 is an isometric showing of the idler roll assembly of FIGS. 1 and 2 with parts broken away to show internal constructions thereof.

Referring now to the drawings, there is shown a conveyor belt 10 and idler roll supporting system with the belt moveable in a path in the direction of the arrows as shown. The shafts 12 supporting the belt through disks 14. The shafts may be solid or tubular cylinders. Typically, the underside of the upper strand of the belt is supported by conventional steel rolls. The ceramic rolls of the instant invention could, however, be used there. Each such shaft is supported on one, but, preferably, both of its ends, by roller or other bearing assemblies 16. This permits free rotation of the shafts and disks during normal operation being driven by the driven belt.

The ceramic disks 14 of the preferred embodiment are shown as tubular and mounted upon and concentric with the shaft for providing support directly to the belt of the conveyor assembly. While the primary embodiment discloses the use of ceramic disks, it should be appreciated that the sleeves 18 which are at the heart of the instant invention are equally applicable to be utilized in association with disks of other materials. They are particularly useful, however, in supporting disks which are brittle and not ductile such as ceramic, glass or of other porcelain type materials. Such materials are generally extruded or cast and then fired or baked rather than being machined so that close tolerances may not easily be maintained particularly at their inside diameter.

Alternately, the shaft could be fixedly supported at its end or ends with fixed support assemblies. Rotatable bearing assemblies could be located upon and secured to the fixed shaft with the exterior surface of each such bearing assembly being adapted to receive the sleeve 18 and ceramic disk 14.

Located between the shaft 12 and disk 14, in the disclosed preferred embodiment, is the sleeve 18 of tubular shape for coupling the shaft and disk in such fashion so as to preclude rotation therebetween when met with a turning force as might occur in applications for idler rolls in conveyor assemblies. The shaft, sleeve and disk jointly constitute the roller assembly 20.

The sleeve is preferably injection molded, extruded or otherwise constructed of acrylonitrile-butadiene-styrene copolymer, ABS, or other rigid plastic such as rigid polyvinyl chloride, PVC, high density, ultra high molecular weight polyethylene (molecular weight is usually in the range of 2-6 million) or polypropylene. Such rigid plastic is then provided with a chemical blowing agent such as carbon dioxide or nitrogen to create a rigid foam having as for example a 40% to 45% void content. Any chemical blowing agent, that is both organic and inorganic, may be used. Illustrative examples of useful blowing agents are sodium bicarbonate or ammonium carbonate, either alone or in combination with organic acids such as stearic acid; maleic or phthalic anhydride with calcium carbonate or barium peroxide; organic acids with aluminum or magnesium powder; hydrazine derivatives of organic sulfo acids, benzilmonohydrazone, and the like.

The voids are normally created by adding the blowing agent either before or during extrusion. The void content is intended to provide a sleeve whose compression range exceeds at least 10% of the maximum tolerance of the inside diameter of the disk and the outside diameter of the shaft. Depending on the materials used, the void content could be reduced to about 25%. If reduced to beneath 25%, problems could arise since the sleeve could become relatively hard to unacceptably overly reduce its compressibility for use over the wide range of tolerances which might be generally encountered. The void content could also be increased up to 50%. But if increased to over 50%, sleeve problems could also arise since the sleeve could begin to get too weak in its gripping properties between the disk and shaft which it is intended to couple. A greater than 50% void content would generally render such sleeve unacceptable over a sufficiently wide range of applications. The amount of chemical blowing agent provided in the rigid plastic compound prior to or during extrusion or molding will determine in large part the characteristics of the resultant sleeve. Laboratory tests have shown that there is a definite relationship between the torque and residual void content of the sleeve after being pressed on a shaft.

By way of example, the resulting sleeve when constructed in accordance with the above-described materials will exhibit from 10% compression at the high side of the tolerance level to up to 25% compression at the low side of the tolerance level when the blowing agent approaches the 50% void content. In the optimum case, a 45% void content created through the blowing agent into the ABS sleeve prior to its extrusion will create the optimum blend of compressibility, hardness and resistance to slip for most applications as idler rolls and conveyor assemblies.

When compressing the sleeve during the mounting operations, the sleeve should never be compressed beyond the theoretical zero void volume dimension, i.e., that dimension where compression is beyond that normally permitted by the supplied void content since such compression would cause harmful effects on the otherwise noncompressible plastic. Furthermore, when mounted and in use the sleeve should not be overly compressed since it would set up undesirable stresses in the ceramic sleeve normally in moderate tension from the sleeve.

The resulting assembly might, for example, include a ceramic disk having a 2-37/64 inch inside diameter while being 1½ inches long. The commercial tolerance of such a ceramic disk might be plus or minus 0.038 inch. An appropriate sleeve to accommodate the disks would be nominally made with 2.190 inches inside diameter and a 2.594 inch outside diameter. When coupled to a 2¼ inch outside diameter shaft, it was found that the assembly could resist turning at over 150 ft/lbs of torque, well over the required amount of resistance to turning found to be required to perform satisfactorily when in service.

The sleeve in such an assembly made from ABS was found to be a noncombustive, nonrusting, having a long life, be abrasion resistant, impact absorbent, impervious to acid, grease, oil, water and electrolysis and resilient from 0° to 150° F.

Various modifications can be made to the instant sleeve of the instant assembly as through treating either the interior or exterior surface or both of such sleeve with a supplemental skin of plastic to reduce the possibility of its impregnation with harmful particulate material. This sleeve could also be cut through along its axis or a longitudinal strip removed to increase useability over a wider range of shafts and disks with which it is to be employed.

While the instant invention has been described as being carried out with a specific embodiment thereof, it is not intended to be so limited. Rather, it is intended to be protected broadly within the spirit and scope of the appended claims.

What is claimed is:

1. A cylindrical conveyor belt roller assembly comprising
an elongated cylindrical shaft having supportable shaft ends,
a tubular disk of ceramic material,
and a tubular sleeve having an inner cylindrical surface concentrically supported by friction upon the outer surface of said shaft, said sleeve also having an exterior surface concentrically supporting, by friction, the inner surface(s) of said disk, said sleeve being formed of a rigid, deformable, non-elastic, high modulus plastic material being selected from the group consisting of rigid PVC, high density, ultra high molecular weight polyethylene, polypropylene and ABS, and having a void content, of from about 25% to about 50%, sufficient to permit the mounting of said disk upon said sleeve and said sleeve upon said shaft without adversely stressing said sleeve while in tension due to its compression between said shaft and disk.

* * * * *